United States Patent

[11] 3,548,806

| | | | | | |
|---|---|---|---|---|---|
| [72] | Inventor | John C. Fisher<br>Santa Barbara, Calif. | 2,235,894 | 3/1941 | Lee .............................. 128/2.05M |
| [21] | Appl. No. | 740,379 | 2,538,125 | 1/1951 | Reid ............................. 128/2.05M |
| [22] | Filed | June 26, 1968 | 2,812,757 | 11/1957 | Lusk et al. .................... 128/2 |
| [45] | Patented | Dec. 22, 1970 | 3,034,500 | 5/1962 | Backster, Jr. ................. 128/2.1 |
| [73] | Assignee | General Electric Company<br>a corporation of New York | 3,087,488 | 4/1963 | Streimer ...................... 128/2.05R |
| | | | 3,347,223 | 10/1967 | Pacela ......................... 128/2.1 |

Primary Examiner—Charles F. Rosenbaum
Assistant Examiner—J. B. Mitchell
Attorneys—Richard R. Brainard, Marvin Snyder, Paul A. Frank, Frank L. Neuhauser, Oscar B. Waddell and Melvin M. Goldenberg

[54] MASS EMOTIONAL REACTION MEASUREMENT SYSTEM
9 Claims, 1 Drawing Fig.

[52] U.S. Cl. ...................................................... 128/2.05,
73/155, 128/2.1
[51] Int. Cl. ...................................................... A61b 5/02,
A61b 5/04, E21b 47/00
[50] Field of Search ........................................... 128/2.05,
2.1, 2, 2.08; 73/155; 324/2

[56] References Cited
UNITED STATES PATENTS
1,472,016  10/1923  Dressler ........................ 128/2.05M ABSTRACT: A system for measuring changes in physiological phenomena of a group of people as they undergo emotional stress. Each individual is connected, through sensors, to apparatus for monitoring one or more of blood pressure, respiration, and skin resistance. Output signals produced by the system provide indications of collective changes in blood pressure level, pulse rate, respiration frequency, respiration amplitude, and skin resistance, or any combination thereof. By monitoring these output signals, changes in emotional stress of the individuals as a group may be detected.

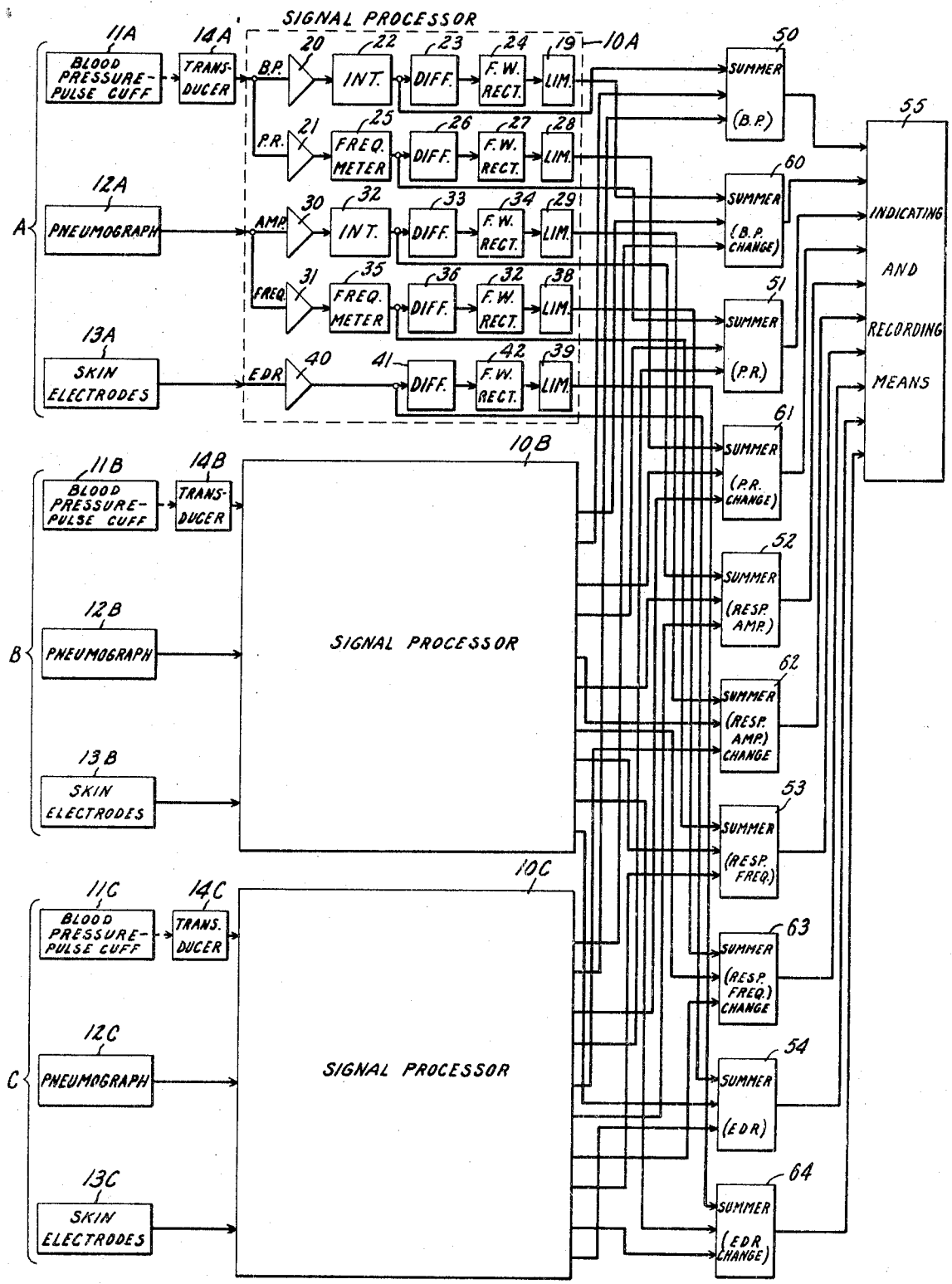

3,548,806

MASS EMOTIONAL REACTION MEASUREMENT SYSTEM

This invention relates to determination of emotional reactions, and more particularly to a system for measurement of collective physiological phenomena of a group of individuals undergoing various conditions of emotional stress.

Measurement of physiological phenomena of separate individuals in order to detect changes in emotional stress being experienced by such persons has long been well-known. Perhaps the most widely known apparatus for making such measurement is the polygraph or "lie detector." This instrument records physiological phenomena of an individual as he orally replies to questions orally presented to him. By careful analysis of the individual's physiological phenomena thus recorded, an indication of a deceptive reply may be obtained. Such measurements are also useful in obtaining reactions of an individual to stimuli other than questions. For example, measurement of an individual's physiological response to advertising may be quite useful in determining what type of advertising is most effective, and upon whom, since the individual's true psychological reaction to this advertising may be determined from his physiological responses; in fact, psychological reaction to the advertised product itself may be quite useful in helping to determine the most attractive form of product packaging for example.

One problem in ascertaining emotional reactions to various stimuli such as advertisements, manufactured products, etc., is that a large number of individuals must be subjected to measurement of their physiological responses in order to obtain a statistically valid indication which can be extrapolated to the collective physiological response of a large group. Because each individual must be tested and monitored separately, and his physiological responses analyzed separately, this procedure can be very tedious and time consuming, not to mention highly expensive. For these reasons, measurement of physiological phenomena is rarely used to ascertain psychological reactions of a group of individuals. The present invention, therefore, is directed to a system whereby the physiological responses of a plurality of individuals may be measured simultaneously to produce a single composite emotional reaction representative of the group's reaction collectively. The convenience of such system in determining collective emotional reactions of a group is manifest.

Accordingly, one object of the invention is to provide a system for measuring changes in a composite of a particular physiological phenomenon occurring simultaneously in each one of a group of individuals without need for measuring the specific physiological phenomena of any single individual of the group.

Another object is to provide a system for obtaining a collective indication of emotional reaction by the individuals of a group in response to a stimulus presented to the group.

Another object is to provide a system for monitoring, in real time, statistically significant changes in a plurality of composite physiological phenomena derived from those physiological phenomena of individuals in an audience.

Briefly, in accordance with a preferred embodiment of the invention, a system is provided for measuring emotional reaction of a group, en masse, to a stimulus presented to the group. The system comprises means for sensing a physiological phenomenon simultaneously in each individual of the group, change-detecting means coupled to each of the sensing means for detecting changes in a measured physiological phenomenon occurring in any of the individuals, change summation means coupled to each of the change-detecting means for producing an output signal indicative of the sum of the changes detected in the phenomenon in each of the individuals, and additional summation means coupled to each of the sensing means for producing an output signal indicative of the total measurement of each phenomenon for the group. Utilization means responsive to each of the summation means are provided for producing an indication of changes in a composite of the phenomenon in the individuals, as well as the composite phenomenon itself, thus facilitating determination of emotional reactions to the stimulus by the group.

BRIEF DESCRIPTION OF THE DRAWING

The features of the invention believed to be novel are set forth with particularity in the appended claims. The invention itself, however, both as to organization and method of operation, together with further objects and advantages thereof, may best be understood by reference to the following description taken in conjunction with the accompanying drawing in which the single FIG. is a block diagram of a system embodying the instant invention.

DESCRIPTION OF TYPICAL EMBODIMENTS

In the FIG., a system for measuring changes in physiological phenomena of a group of three individuals designated A, B and C, is illustrated. However, although the system is illustrated for but three individuals, it is clear that a much larger number of individuals may be monitored in this manner. Associated with each of individuals A, B and C is a signal processor 10A, 10B and 10C, respectively. Each of signal processors 10A, 10B and 10C is responsive to signals supplied from one or more sensors.

Sensors which may be employed for monitoring physiological phenomena include a blood pressure-pulse cuff which measures both blood pressure and pulse rate and generally comprises a large air sac wrapped around an arm or leg. The sac is inflated to a level which exerts sufficient pressure on the limb to just counteract the blood pressure. This level is determined by listening to blood flow in an artery below the cuff. Thus, the cuff is inflated to a pressure between the diastolic pressure and the systolic pressure, and a pressure sensitive transducer coupled pneumatically to the air pressure within the cuff produces an electrical output signal which varies in accordance with variations in air pressure in the cuff. This apparatus is sometimes referred to as an electronic sphygmomanometer.

Respiration is monitored by a pneumograph, which typically comprises a bellows attached to a unit which is strapped around the chest. As the subject breathes, the bellows is alternately elongated and compressed, moving a shutter assembly attached to the bellows back and forth so as to expose a photocell to more or less light. A pneumograph of this type is available from E&M Instrument Co., Inc., Houston, Texas, and is described by H. M. Yanof on pages 183—184 of Biomedical Electronics (F. A. Davis Company, Philadelphia, 1965). Output of the photocell, therefore, produces the electrical output signal which may be supplied to the signal processor.

Galvanic skin response, from which electrical resistance of the skin may be determined, can be measured by use of a pair of silver-silver chloride surface electrodes such as are available from Beckman Instruments, Inc., Palo Alto, California. In this type of electrode, the silver is surrounded by a layer of silver chloride which acts as a stable source of silver ions. Alternatively, electrodes may be fabricated by electroplating silver discs with a thin layer of silver chloride, and thereafter spreading a layer of Ringer's paste, about 1/16 of an inch thick, onto the electroplated layer of the electrodes. The paste comprises approximately equal parts of bentonite (white clay) and glycerin, thinned to the consistency of putty by either Ringer's (or physiological salt) solution or a salt solution made up of one level teaspoon of table salt in a pint of water. One electrode is strapped to each palm of the subject, preferably with a section of sponge rubber between the electrode and strap to supply uniform pressure and good contact with the skin. Additional details regarding obtaining this galvanic skin response or electrodermal response (EDR) from which skin resistance is determined, may be obtained from Woodworth, R. S. and Schlosberg, H., Experimental Psychology (Holt, Rinehart and Winston, New York, 1954) 137.

In accordance with the foregoing, each of signal processors 10A, 10B and 10C is responsive to signals supplied from a pressure transducer 14A, 14B and 14C, respectively, each of which is pneumatically coupled to a blood pressure-pulse cuff 11A, 11B and 11C, respectively. In addition, each of signal processors 10A, 10B and 10C is also responsive to a pneumograph tube 12A, 12B and 12C, respectively, and skin electrodes 13A, 13B and 13C, respectively. It should be noted that all three types of sensing means 11, 12 and 13, need not be employed in the system, since any combination of sensing means may be utilized instead; however, for descriptive purposes, it will be assumed that all three-sensing means are employed. Moreover, since the apparatus of each of signal processors 10A, 10B and 10C is identical, and each functions in identical manner, only the apparatus of signal processor 10A will be described.

Output signals from transducer 14A are furnished to a pair of amplifiers 20 and 21 in parallel. Output signals from amplifier 20, which represent blood pressure and are thus in the form of an AC signal with maximum amplitude proportional to the systolic pressure and minimum amplitude proportional to the diastolic pressure, are filtered or integrated in an integrator 22 so as to produce a smooth, DC signal which is furnished to a summer circuit 50. The integrated signal is also furnished to a differentiator 23 wherein any change in amplitude of the integrated signal, which corresponds to a change in blood pressure and may be either in the form of an increase or decrease, results in an output signal from the differentiator. The differentiator output signal, which may be either negative-going or positive-going, is rectified in a full-wave rectifier 24 so that both polarities, corresponding to increases and decreases in blood pressure, result in an output signal from the rectifier which is of but one polarity. Use of this unipolar signal permits summation of the absolute values of blood pressure changes in all the individuals being monitored, and precludes cancellation of signals where simultaneously one individual's blood pressure rises and another's falls. Preferably, a voltage limiter 19 prevents the output signal amplitude of rectifier 24 from exceeding a predetermined value and thus being weighted excessively in evaluation of the group's emotional reactions.

Output signals from amplifier 21 are representative of pulse rate, since the pulse rate corresponds to the number of systolic peaks per unit time, and thus constitute a measure of frequency of the AC output signal from transducer 14A. The output signal from amplifier 21 is furnished to a frequency-to-amplitude converter such as frequency meter 25, which produces a smooth, DC signal of amplitude proportional to frequency of its input signal. A detailed description of one specific type of frequency meter is set forth in Millman, J. and Taub, H., Pulse and Digital Circuits (McGraw-Hill Book Co., Inc., New York 1956), 352. The output signal from frequency meter 25, which is furnished to a summer circuit 51, is also furnished to a differentiator 26 so that any changes in frequency rate of the signal from transducer 14A, which correspond to a change in pulse rate of the subject and may be either in the form of an increase or decrease, are differentiated with respect to time and furnished to a full-wave rectifier 27. Rectifier 27 functions in a manner similar to that of rectifier 24 in that any changes in pulse rate, be they increases or decreases and represented by either positive-going or negative-going signals from differentiator 26, are indicated at the output of rectifier 27 by a unipolar signal. This permits summation of the absolute values of pulse rate changes in all the individuals being monitored, and precludes cancellation of signals where simultaneously one individual's pulse rate rises and another individual's pulse rate falls. A voltage limiter 28 prevents the output signal amplitude of rectifier 27 from exceeding a predetermined value and thus being weighted excessively in evaluation of the group's emotional reactions.

Output signals from pneumograph 12A are furnished, in parallel to the inputs of a pair of amplifiers 30 and 31. Output signals from amplifier 30, which represent respiration amplitude and are in the form of an AC signal wherein a rising amplitude may correspond to inspiration and a falling amplitude may correspond to expiration, are filtered or integrated in an integrator 32 so as to provide a smooth, DC signal which is furnished to a summer circuit 52. The integrated signal is also furnished to a differentiator 33 wherein any change in amplitude of the integrated signal, which corresponds to a change in amplitude or depth of respiration and may be either in the form of an increase or decrease, results in a differentiator output signal representative of a change in depth of breathing. The differentiator output signal, which may be either negative-going or positive-going, is rectified in a full-wave rectifier 34 so that a change to either deeper or shallower breathing results in an output signal from the rectifier which is of but one polarity. Use of this one polarity permits summation of the absolute values of depth of breathing changes in all the individuals being monitored, and precludes cancellation of signals where simultaneously one individual's breathing becomes deeper and another's breathing becomes shallower. A voltage limiter 29 prevents the output signal amplitude of rectifier 34 from exceeding a predetermined value and thus being weighted excessively in evaluation of the group's emotional reactions.

Output signals from amplifier 31 represent respiration rate, since the respiration rate corresponds to the number of inspirations per unit time. These signals are furnished to a frequency-to-amplitude converter such as frequency meter 35, which produces a smooth, DC signal of amplitude proportional to frequency of its input signal in a manner similar to that of frequency meter 25. The output signal from frequency meter 35, which is furnished to a summer circuit 53, is also furnished to a differentiator 36 so that any changes in frequency rate of the signal from amplifier 31, which correspond to a change in respiration rate of the subject and may be in the form of an increase or decrease, are differentiated with respect to time and furnished to a full-wave rectifier 37. Rectifier 37 functions in a manner such as described for rectifiers 24, 27 and 34, and assures that any increases or decreases in respiration rate, represented by either positive-going or negative-going signals from differentiator 36, result in an output signal which is of but one polarity so as to preclude cancellation of signals where simultaneously one individual's respiration rate rises and another's falls. A voltage limiter 38 prevents the output signal amplitude of rectifier 37 from exceeding a predetermined value and thus being weighted excessively in evaluation of the group's emotional reactions.

Skin electrodes 13A are connected to a voltage source (not shown) in order to provide an EDR signal to the input of an amplifier 40. This signal varies in amplitude according to the skin resistance of the subject. Output signals from amplifier 40, which are furnished to a summer circuit 54, are also differentiated with respect to time by a differentiator circuit 41 so as to furnish an output signal to a full-wave rectifier 42 whenever a change in skin resistance of the subject takes place. An output signal from differentiator 41 is produced whenever the skin resistance of the subject increases or decreases and, in dependence thereon, is either negative-going or positive-going; however, the output signal from full-wave rectifier 42 in response thereto is of but one polarity, for reasons previously stated. Use of this one polarity permits summation of the absolute values of skin resistance changes in all the individuals being monitored, and precludes cancellation of signals where one individual's skin resistance increases and another's decreases at the same time. A voltage limiter 39 prevents the output signal amplitude of rectifier 42 from exceeding a predetermined value and thus being weighted excessively in evaluation of the group's emotional reactions.

Output signals from signal processors 10A, 10B and 10C are furnished to a plurality of summer circuits so that signals representing both the collective changes in each of the five monitored physiological phenomena, as well as the total of each of the monitored phenomena, may be derived. Thus, signals representing totals of blood pressure, pulse rate, respiration amplitude, respiration frequency and electrodermal response are provided respectively to a summer circuit 50, 51, 52, 53 and 54 from each of the signal processors, as previously described. The composite output signals from summer circuits 50, 51, 52, 53 and 54, each of which corresponds to a collective physiological phenomenon of the group of subjects being monitored, are furnished to indicating and recording means 55 which graphically display the monitored composite signals, as on a strip chart driven by a synchronous motor. Similarly, signals representing changes in blood pressure, pulse rate, respiration amplitude, respiration frequency and electrodermal response are provided respectively to a summer circuit 60, 61, 62, 63 and 64 from each of the signal processors. The composite output signals from summer circuits 60, 61, 62, 63 and 64, each of which corresponds to changes in a collective physiological phenomenon of the group of subjects being monitored, are also furnished to change indicating and recording means 55 which graphically display the composite signals thus monitored, as on the aforementioned strip chart.

While any combination of blood pressure, pulse rate, respiration amplitude, respiration frequency and electrodermal response may be monitored, the ensuring description of operation assumes that all of these phenomena are being monitored. Switches may be used in conventional fashion to open or close the circuits to obtain any desired combination, and only those sensors monitoring the phenomena which are to be recorded need be employed.

Sensors 11A, 12A and 13A are placed on a first subject A whose physiological phenomena are to be monitored. Similarly, sensors 11B, 12B and 13B are placed on a second subject B whose physiological responses are to be monitored, etc. The subjects are then exposed, as a group, to external sensory stimuli which may be audible, visible, etc. Examples of audible stimuli might include questions to which all the subjects are to respond, questions to which only a predetermined subject is to respond, declaratory statements to which no response is to be made, etc. Examples of visible stimuli might include presentation to the group of an image projected on a screen, display of various objects, etc. Olfactory stimuli may also be presented to the group.

As long as no change is produced in the emotional state of any subject, and the subjects remain quiet and undistracted, their monitored physiological phenomena should undergo no change. Under these conditions, the signals furnished to summer circuits 50, 51, 52, 53 and 54 remain constant, and no output signal is furnished from any of the differentiator circuits to summer circuits 60, 61, 62, 63 and 64. Thus, the composite signals being monitored by indicating and recording means 55 undergo no change since the output signals produced by summer circuits 50—54 and 60—64 undergo no change. When a change in any of the monitored physiological phenomena of any subject does occur, an output signal is furnished to at least one of summers 60—64 from the signal processor to which the subject's sensors are attached. This is because the change detected by the differentiator in the appropriate circuit results in an output signal from the differentiator which, after passage through the full-wave rectifier connected thereto and being restricted to a predetermined maximum amplitude by the limiter circuit associated with the rectifier, is furnished to the summer circuit connected to the limiter circuit. In addition, a change in output signal furnished to at least one of summers 50—54 from the signal processor to which the subject's sensors are attached also occurs.

For example, assume that a decrease in blood pressure of subject A occurs. This decrease in blood pressure causes a decrease in the output signal amplitude of integrator 22. This decrease is detected by differentiator circuit 23, which thereupon furnishes an output signal to full-wave rectifier 24. Regardless of the differentiator circuit output signal polarity, which may be either positive or negative depending upon the direction of change in output signal from integrator circuit 22, full-wave rectifier 24 produces a unipolar signal which is applied to summer 60 through limiter 19. By virtue of limiter 19, this unipolar signal is restricted to a maximum amplitude, so that the change in blood pressure of subject A cannot be accorded excessive weight in evaluating collective changes in blood pressure for the group of subjects. Similarly, any changes in blood pressure sensed in any of the other subjects also result in signals being furnished to summer 60. These signals are of the same polarity as the output signal from full-wave rectifier 24 of signal processor 10A, even though the blood pressure changes from which they arose may have been increases instead of decreases, and are also amplitude limited. Thus, the output signal from summer 60 increases, and this increased signal is recorded and displayed by indicating and recording means 55. It should be noted, however, that the decrease in blood pressure of subject A also serves to lower the amplitude of output signal from summer 50 while any increase in blood pressure of any of the subjects being monitored serves to increase the amplitude of output signal from summer 50. Thus the output signal from summer 50 represents a measure of the total blood pressure of the monitored subjects.

If, at the same time a decrease in blood pressure of subject A occurs, a change in skin resistance of subject A also takes place for example, this change is detected by differentiator circuit 41, and whether the change be an increase or decrease in resistance, full-wave rectifier 42 furnishes an amplitude limited output signal of one polarity to summer circuit 64 while the signal supplied to summer circuit 54 from signal processor 10A undergoes either an increase or decrease in amplitude depending upon whether the change is an increase or a decrease in resistance. Signals of the same polarity are supplied to summer circuit 64 from any other signal processors connected to a subject who experiences either an increase or decrease in skin resistance as detected by his skin electrodes. It should be noted, however, that the output signal of summer circuit 54 undergoes either an increase or a decrease in amplitude, depending upon whether the net change in measured skin resistance of the group is an increase or a decrease.

In similar fashion, any changes in pulse rate, respiration amplitude or respiration frequency also result in amplitude limited unipolar signals being furnished from the signal processor monitoring the subject undergoing the changes to summers 61, 62 and 63, respectively, and in signals of either increased or decreased amplitude, depending upon the direction of change, being furnished to summers 51, 52 and 53, respectively. The output signals of the summer circuits, therefore, are recorded and displayed on indicating and recording means 55 as indicators of both change in monitored physiological phenomena and of the net amplitude of the monitored physiological phenomena themselves.

It is clear that, to be statistically significant, the change in any collective physiological phenomenon being measured must exceed a predetermined level. However, this level may be lower if, at the same time the change in the aforementioned collective physiological phenomenon occurs, a change in another collective physiological phenomenon occurs. As a generality, it may be stated that the larger the number of collective physiological phenomena having changed at a predetermined time, the greater the assurance that a change has occurred in emotional stress of at least some subjects in the group. Thus, correlation of the indicated changes in the collective physiological phenomena, as well as determination of the amplitudes of the changes themselves, are required in order to evaluate the group's emotional reactions with a high degree of validity.

By utilizing for indicating and recording means 55 a strip chart recorder, driven by a synchronous motor, ten separate lines may be simultaneously recorded on the moving chart by ten-pens or styli respectively. The ten-styli, along with an eleventh, stimulus-indicating stylus, are aligned across the chart normal to its direction of motion. Each deflection of any one of the ten separate lines corresponds to a change in the collective physiological phenomenon represented by that line.

The eleventh stylus makes a small mark on the chart under control of the operator of the apparatus at each instant a stimulus is presented to the group of subjects. Accordingly, any deflection of one or more of the ten separate lines may be correlated with a particular stimulus presented to the group so that the change thus indicated in the monitored physiological phenomena may be attributed to the particular stimulus.

The foregoing describes a mass emotional reaction measurement system which is useful in audience reaction situations, and may be applied to new product evaluation, advertising evaluation, lie detection, and any situation where verbal responses may be of doubtful reliability. The system measures changes in the composite of a particular physiological phenomenon occurring simultaneously in each one of a group of individuals, without need for measuring the specific physiological phenomena of any single individual of the group, and provides a collective indication of emotional reaction by the individuals of the group in response to a stimulus presented to the group. By use of the system, moreover, statistically significant changes in a plurality of composite physiological phenomena derived from those physiological phenomena of individuals in an audience, may be monitored in real time.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. A system for measuring emotional reaction of a group, en masse, to a stimulus presented to the group, comprising: means for sensing a physiological phenomenon simultaneously in each individual of the group and producing electrical output signals in response thereto; signal processing means, comprising at least differentiator means, coupled to said sensing means for processing said electrical output signals to detect changes in a measured physiological phenomenon occuring in any of the individuals; summation means coupled to each of the signal-processing means for producing an output signal indicative of changes detected in said phenomenon in each of the individuals; and utilization means responsive to the summation means for producing an indication of changes in a composite of said phenomenon in the individuals in order to facilitate determination of the emotional reactions of the group.

2. The system of claim 1 wherein said sensing means includes sphygmomanometer means.

3. The system of claim 1 wherein said sensing means includes pneumograph means.

4. The system of claim 1 wherein said sensing means includes electrodes adapted to contact the skin of an individual in said group.

5. The system of claim 2 wherein said change detecting means comprises filter means coupled to said sphygmomanometer means for producing a DC signal of amplitude indicative of blood pressure, differentiator means coupled to said filter means for detecting changes in the amplitude of said DC signal, and rectifier means coupled to said differentiator means for producing unipolar output signals indicative of changes in output signals of said differentiator means.

6. The system of claim 2 wherein said change detecting means comprises frequency-to-amplitude conversion means coupled to said sphygmomanometer means for producing a DC signal of amplitude indicative of pulse rate, differentiator means coupled to said frequency-to-amplitude conversion means for detecting changes in the amplitude of said DC signal, and rectifier means coupled to said differentiator means for producing unipolar output signals indicative of changes in output signals of said differentiator means.

7. The system of claim 3 wherein said change detecting means comprises filter means coupled to said pneumograph means for producing a DC signal of amplitude indicative of respiration amplitude, differentiator means coupled to said filter means for detecting changes in the amplitude of said DC signal, and rectifier means coupled to said differentiator means for producing unipolar output signals indicative of changes in output signals of said differentiator means.

8. The system of claim 3 wherein said change detecting means comprises frequency-to-amplitude conversion means coupled to said pneumograph means for producing a DC signal of amplitude indicative of respiration frequency, differentiator means coupled to said frequency-to-amplitude conversion means for detecting changes in the amplitude of said DC signal, and rectifier means coupled to said differentiator means for producing unipolar output signals indicative of changes in output signals of said differentiator means.

9. The system of claim 4 wherein said change detecting means comprises differentiator means coupled to said skin electrodes and producing a DC signal of amplitude indicative of changes in skin resistance, and rectifier means coupled to said differentiator means for producing unipolar output signals indicative of changes in output signal of said differentiator means.